(12) United States Patent
Ichinokawa

(10) Patent No.: US 9,903,723 B2
(45) Date of Patent: Feb. 27, 2018

(54) SYSTEM AND METHOD FOR STORING AND RECALLING LOCATION DATA

(71) Applicant: HONDA MOTOR CO., LTD., Tokyo (JP)

(72) Inventor: Jumpei Ichinokawa, Rolling Hills Estate, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 14/876,604

(22) Filed: Oct. 6, 2015

(65) Prior Publication Data

US 2016/0025501 A1 Jan. 28, 2016

Related U.S. Application Data

(63) Continuation of application No. 13/898,813, filed on May 21, 2013, now Pat. No. 9,188,445.

(51) Int. Cl.

| | | |
|---|---|---|
| *G01C 21/00* | (2006.01) | |
| *G01C 21/28* | (2006.01) | |
| *G01C 22/00* | (2006.01) | |
| *G01C 21/34* | (2006.01) | |
| *G01S 19/45* | (2010.01) | |

(52) U.S. Cl.
CPC ............ *G01C 21/28* (2013.01); *G01C 21/00* (2013.01); *G01C 21/3476* (2013.01); *G01C 22/00* (2013.01); *G01S 19/45* (2013.01)

(58) Field of Classification Search
None
See application file for complete search history.

(56) References Cited

U.S. PATENT DOCUMENTS

| | | | |
|---|---|---|---|
| 5,912,635 A | 6/1999 | Oshizawa et al. | |
| 6,489,921 B1 | 12/2002 | Wilkinson | |
| 7,349,802 B2 | 3/2008 | Lee et al. | |
| 8,180,379 B2* | 5/2012 | Forstall | G01C 21/12 |
| | | | 455/41.2 |
| 8,762,059 B1 | 6/2014 | Balogh | |
| 9,147,219 B2* | 9/2015 | Binion | G07C 5/085 |
| 9,252,951 B1* | 2/2016 | Katzer | G07C 9/00309 |
| 9,275,417 B2* | 3/2016 | Binion | G07C 5/085 |
| 2006/0287824 A1 | 12/2006 | Lin | |
| 2007/0124043 A1 | 5/2007 | Ayoub et al. | |

(Continued)

FOREIGN PATENT DOCUMENTS

| | | |
|---|---|---|
| JP | S62-293120 A | 12/1987 |
| JP | H07-253327 A | 10/1995 |

(Continued)

*Primary Examiner* — Truc M Do
(74) *Attorney, Agent, or Firm* — Arent Fox LLP

(57) ABSTRACT

A system and method for recalling and utilizing location data are presented. A connection between a device and a vehicle is detected. After the connection is detected, a first set of data stored on the device is identified. The first set of data includes a last known location of the vehicle. A current value of a vehicle sensor is compared to a historical value of the vehicle sensor. The historical value was captured from the vehicle sensor at about a time the first set of data was stored on the device. When the current value of the vehicle sensor is the same as the historical value of the vehicle sensor, the first set of data is used to define a current location of the vehicle.

15 Claims, 10 Drawing Sheets

(56) References Cited

U.S. PATENT DOCUMENTS

| | | |
|---|---|---|
| 2009/0005070 A1* | 1/2009 | Forstall .................. G01C 21/12 455/456.1 |
| 2010/0318288 A1 | 12/2010 | Korn et al. |
| 2011/0153367 A1 | 6/2011 | Amigo et al. |
| 2011/0307188 A1 | 12/2011 | Peng et al. |
| 2012/0078497 A1 | 3/2012 | Burke, Jr. |
| 2013/0006674 A1* | 1/2013 | Bowne ............... G06Q 10/0639 705/4 |
| 2013/0332007 A1 | 12/2013 | Louboutin |
| 2014/0094995 A1 | 4/2014 | Scott |
| 2014/0232593 A1 | 8/2014 | Varoglu |
| 2014/0288828 A1 | 9/2014 | Werner et al. |

FOREIGN PATENT DOCUMENTS

| | | |
|---|---|---|
| JP | 2005-147946 A | 6/2005 |
| JP | 2005-345200 A | 12/2005 |
| JP | 2011-174748 A | 9/2011 |
| WO | WO 2007-040100 A1 | 4/2007 |

* cited by examiner

SYSTEM AND METHOD FOR STORING AND RECALLING LOCATION DATA

CROSS-REFERENCE TO RELATED APPLICATIONS

This application is a continuation of and claims priority to U.S. patent application Ser. No. 13/898,813 entitled "SYSTEM AND METHOD FOR STORING AND RECALLING LOCATION DATA" and filed on May 21, 2013.

BACKGROUND OF THE INVENTION

Many vehicles today include navigation systems that assist a user in navigating to a desired destination. The navigation systems generally use radio frequency (RF) signals transmitted from external sources (e.g., global positioning system (GPS) satellites) to determine the vehicle's current location. Using that current location, the navigation system can then calculate a route to a desired location and assist the user in navigating along that route.

In some cases, to enable navigation services, the vehicle is interconnected with a device, for example, a smartphone or other mobile device, with a vehicle. These systems, though, are generally not useful beyond providing a map and directions for proceeding from a starting point to an end point. Thus, there is a need for device applications that are useful not only for navigation to a point of interest (POI) but also allow the user of the device to store information, such as the location where the vehicle is parked, for how long the vehicle has been parked in the case of a metered space, and the direction of a POI relative to the location of the vehicle.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION OF THE PREFERRED EMBODIMENTS

Figure 1A:
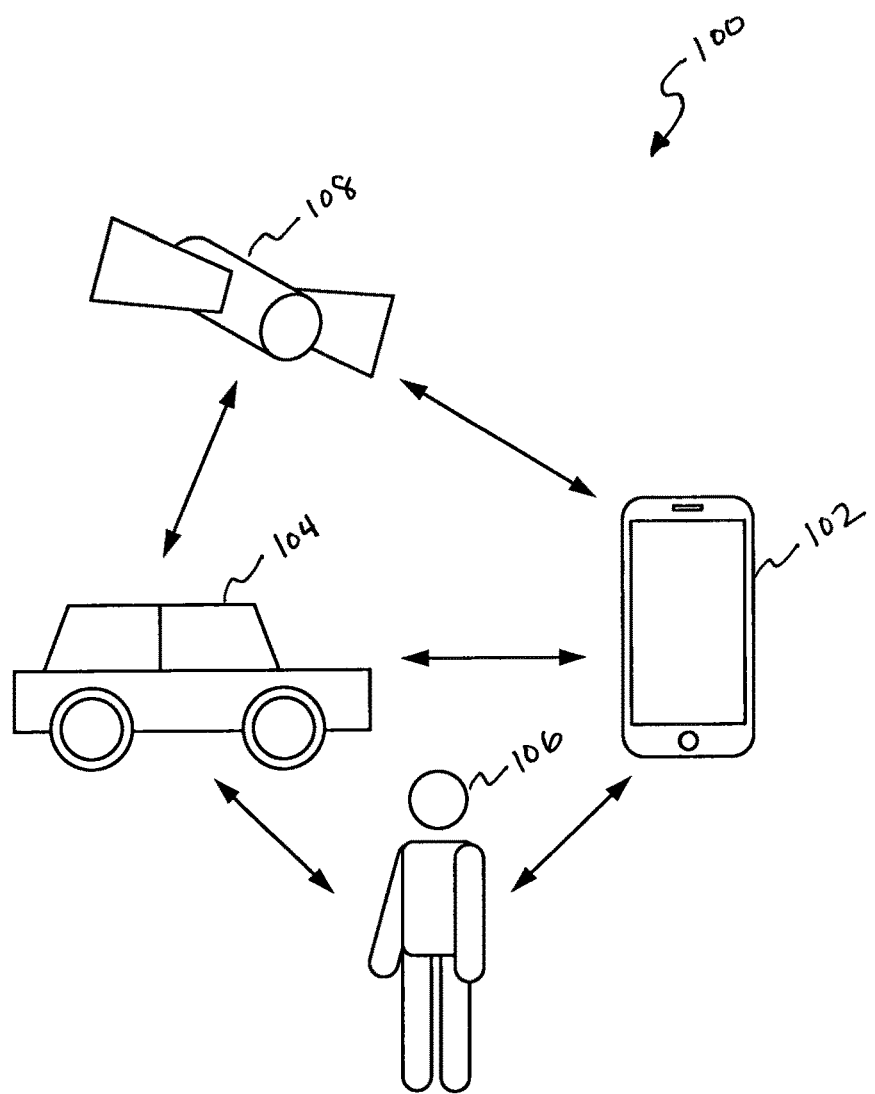
FIG. 1A is a diagram depicting an example environment providing a system for communication between a vehicle, a device, a user and a service provider.

The present invention overcomes the aforementioned drawbacks by providing a system and method for storing and recalling point of interest information. In the present system, a device, such as a mobile phone, executes a navigation application that is configured to interface with a vehicle's display system. During use, the device monitors the vehicle's current location and stores that location. When the vehicle is parked and turned off, the last-known location of the vehicle can be retained for future use. When the user returns to the vehicle, the device can be connected to the vehicle and the vehicle's last known location can be retrieved from the device and displayed using the vehicle's navigation screen. This allows the vehicle's current location to be quickly ascertained and displayed even if GPS coverage is not optimal.

In some cases, though, this approach results in an incorrect depiction of the vehicle's current location. For example, if the user should connect his or her device to the vehicle, but not execute the device's navigation application until after the vehicle has been driven for sometime, the stored vehicle location will be inaccurate. Similarly, if the user simply fails to connect the device when first starting the vehicle and drives some distance before the device is connected, the vehicle's location stored on the device will be inaccurate. Many other circumstances are anticipated in which the vehicle's stored location could become inaccurate over time.

The present system, therefore, uses data from one or more vehicle on-board sensor system (e.g., an odometer, speedometer) to determine whether the location information being retrieved from the device is accurate and should be used for navigation purposes.

In one implementation of the present system, at the time the device is disconnected from the vehicle (thereby causing the vehicle's current location to be stored in the device), the device or the vehicle records or stores the vehicle's current odometer reading. When the device is next connected to the vehicle, the vehicle analyzes the current odometer reading to determine whether the odometer value has changed from the value that was stored earlier, thereby indicating the vehicle's position has changed since the last time the device was connected. If the odometer has changed, the current vehicle location information stored on the device is considered suspect. This allows the vehicle to prompt the user with a warning that the current location information may be incorrect and provide the user the option of deleting the information. In other implementations, the vehicle may instead monitor the vehicle's speedometer, as an example. If the speedometer reading varies from a reading of '0' before the location data is retrieved from the device, that indicates the vehicle has moved rendering the current location data on the device suspect. In various other implementations, other vehicle sensor systems, such as wheel rotation sensors, steering wheel position sensors, accelerometers, and the like, may be utilized to detect that the vehicle's position has changed (or has likely changed) since the location data was previously stored on the device.

Upon determining that the location data is suspect, the navigation system can provide the user with a number of options including: 1) deleting the location data, 2) using the location data anyway, or 3) waiting until updated location data is available (e.g., via GPS) before resuming navigation.

In accordance with one aspect of the invention, a method includes detecting a connection between a device and a vehicle, and, after detecting the connection, identifying a first set of data stored on the device. The first set of data includes a last known location of the vehicle. The method includes comparing a current value of a vehicle sensor to a historical value of the vehicle sensor. The historical value was captured from the vehicle sensor at about a time the first set of data was stored on the device. The method includes, when the current value of the vehicle sensor is the same as the historical value of the vehicle sensor, using the first set of data to define a current location of the vehicle.

In accordance with another aspect of the invention, a method includes disconnecting a device from a vehicle, and, upon detecting that the device is disconnected from the vehicle, providing, by the device, a set of directions to a point of interest.

In accordance with another aspect of the invention, a system includes a processor configured to detect a connection between a device and a vehicle, and after detecting the connection, identify a first set of data stored on the device. The first set of data includes a last known location of the vehicle. The processor is configured to compare a current value of a vehicle sensor to a historical value of the vehicle sensor. The historical value was captured from the vehicle sensor at about a time the first set of data was stored on the device. The processor is configured to, when the current value of the vehicle sensor is the same as the historical value of the vehicle sensor, use the first set of data to define a current location of the vehicle.

Embodiments of the present disclosure include a system and method for storing and recalling POI information. In the context of the present disclosure, a POI may be any type of location including roads, gas stations, strip malls, retail establishments, eating establishments, hospitals, police stations, etc. The means for identifying and recalling a POI may be provided with a motor vehicle. The term "vehicle" as used throughout the specification and claims refers to any moving vehicle that is capable of carrying one or more human occupants and is powered by any form of energy. The term vehicle includes, but is not limited to cars, trucks, vans, minivans, SUVs, motorcycles, scooters, boats, personal watercraft, and aircraft.

The terms "start", "stop" and similar language are used throughout the specification. Generally, starting a vehicle may refer to providing power to one or more on-board systems. This may or may not include starting the engine as well. Starting the vehicle may also refer to shifting into a gear other than "park". Stopping a vehicle may refer to shifting the vehicle into "park" or "neutral" or otherwise parking the vehicle, and may include stopping the vehicle's engine. Stopping may further refer to depressing the brake in order to bring the vehicle to a halt. The vehicle may be parked in a parking lot or structure, on the street, and the like.

The means for storing and recalling a POI may also be provided with a device. The term "device" as used throughout the specification and claims refers to any electronic device that is capable of storing information. The term device includes, but is not limited to a cellular telephone, a smart phone, a tablet computer, a portable GPS system, and the like.

The POI storage and recall system may utilize a number of different technologies to collect and convey data. In some embodiments, the system may require some user input. In other embodiments, the system may be entirely automated. In other embodiments, the system may utilize a wireless communications system. The wireless communications system may be any type of wireless communications system known in the art, for example, a cellular telephone network, satellite communications, or the like. In other embodiments, a service provider may be involved in the relaying data to and from the system such a cellular service provider or a GPS satellite signal provider.

Figure 1B:
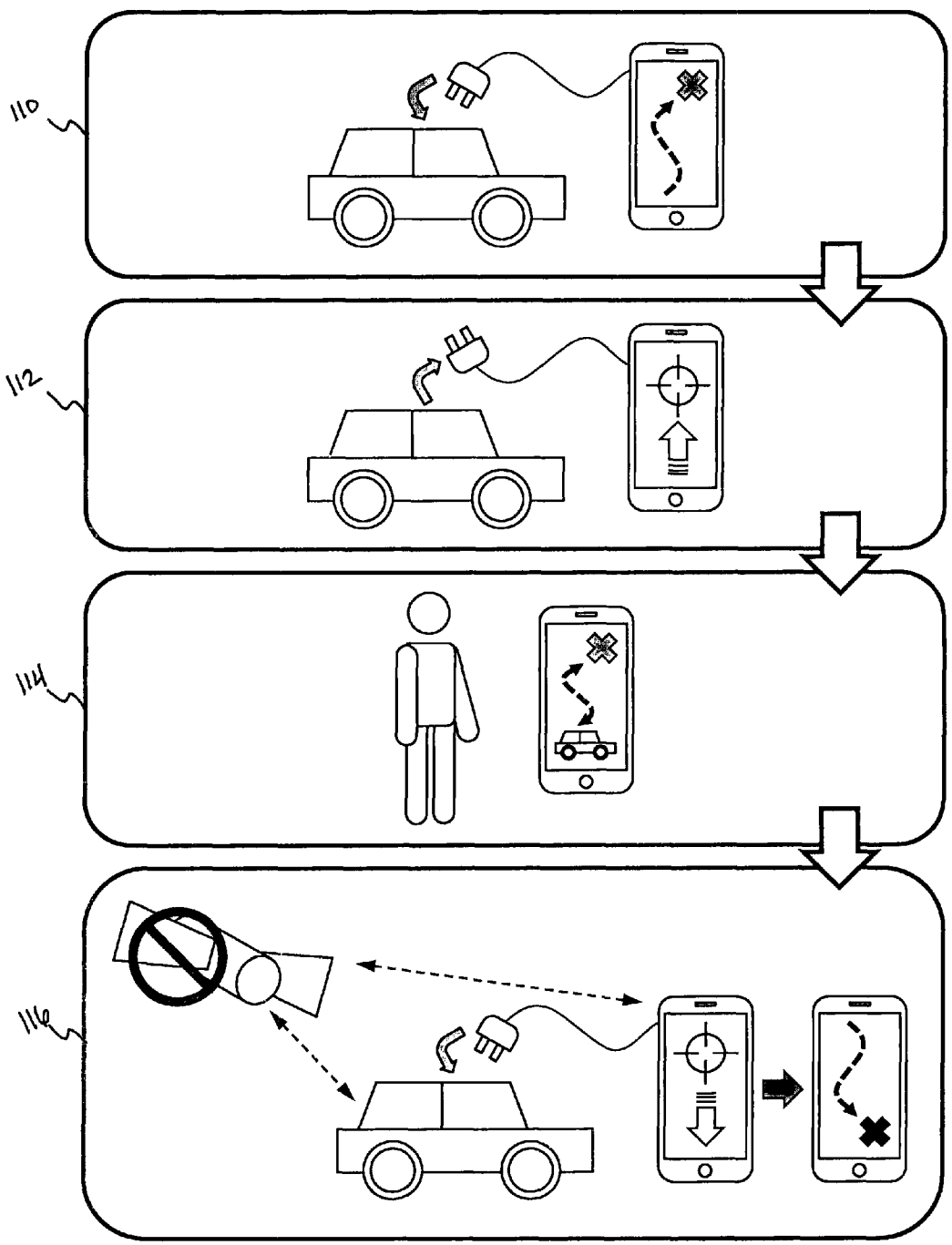
FIG. 1B is a schematic overview of one embodiment of the present disclosure.
Figure 1C:
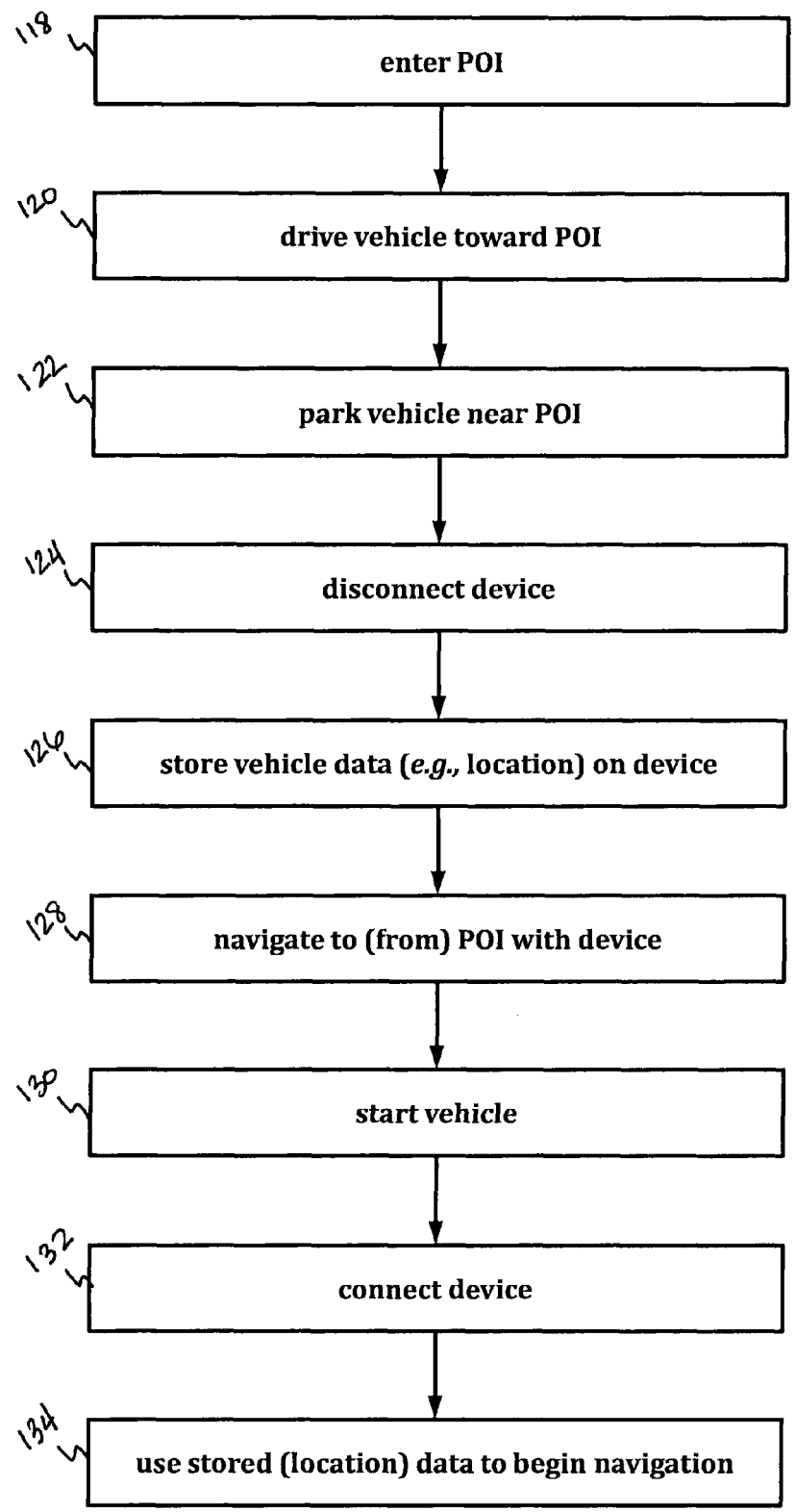
FIG. 1C is a flowchart of a method for storing and recalling location data.

FIGS. 1A-1C provide an overview of the components and methods of the present disclosure. FIG. 1A is a schematic diagram depicting an example environment 100 in which the present system and method may operate. As shown in FIG. 1A, user 106 communicates with both mobile device 102 and vehicle 104. Mobile device 102 may include, for example, a mobile phone and is configured to execute a number of software applications and communicate with a number of external systems. Mobile device 102 communicates with service provider 108 (e.g., a GPS satellite or other external navigation system) to determine a location of mobile device 102. Having determined its current location, mobile device 102 can then provide navigation services to user 106 through a suitable mapping software application, for example.

Mobile device 102 is also configured to communicate with vehicle 104. Mobile device 102 may connect to (and communicate with) vehicle 104 using a wireless communications medium, such as Bluetooth, Wi-Fi, a cellular network, or the like. Alternatively, mobile device 102 may connected to vehicle 104 using a wired connection. Using the communication medium, mobile device 102 may transmit data, including the location of the mobile device 102, to vehicle 104. Vehicle 104 can then use that location information to display a position of vehicle 104 on a map depicted on a suitable display screen within the vehicle 104.

In some cases, in addition to data, mobile device 102 will transmit content to vehicle 104, where that content is configured to be displayed on a display screen within vehicle 104. For example, rather than transmit only location data, mobile device 102 may also transmit a depiction of a map showing a current location to vehicle 104, where the depiction is suitably arranged for display on one or more of the vehicle's display screen. Vehicle 104 can then receive that map depiction and simply display it on a display screen. In such an arrangement, vehicle 104 would not need to store any map or geographical data. Instead, the map data would be stored on, or in a manner accessible to, mobile device 102 and can then be provided to vehicle 104 as necessary.

To enable communications with mobile device 102, vehicle 104 includes one or more processors configured to communicate via one or more vehicle networks or busses. One example network includes a controller area network (CAN), which also enables the processors of vehicle 104 to communicate with one or more sensors that may be installed in or otherwise connected to the vehicle 104. Example sensors include speedometer sensors (configured to measure a rotation speed of one or more of the vehicle's wheels or sense a value of the vehicle's speedometer), steering wheel position sensors, odometer sensors (configured to measure a distance traveled by the vehicle), and the like. Vehicle 104 can collect data from these various sensors and other connected devices (such as mobile device 102) and perform analysis of that data.

In certain embodiments, the components of the system may be in communication through a physical connection such as via a cable or other wired connection. Alternatively, communication between components may comprise a wireless connection such as cellular signal, a Bluetooth signal or a satellite signal.

FIG. 1B and FIG. 1C provide an overview of one implementation of the present disclosure. The following method describes a scenario in which a user travels to a POI in a vehicle connected to a mobile device. Upon arrival at the POI, the device is disconnected from the vehicle and data such as the GPS coordinates of the vehicle at the time the device is disconnected are stored on the device. Upon returning to the vehicle, the device can be reconnected to the vehicle and the stored data retrieved. This data can be used to obviate the need for a GPS signal from a service provider thereby allowing the user to immediately receive navigation instruction from the mobile device (e.g., via the vehicle) in order to proceed to a new POI.

Referring to FIG. 1C, the user 106 may wish to use a vehicle 104 to travel to and from a given POI. The user 106 may also be in possession of a GPS-enabled mobile device 102 in communication with a service provider 108. Furthermore, an application may be active on the mobile device 102 to facilitate data storage and retrieval as described herein. In 118 of FIG. 1C, the user 106 inputs a POI into the mobile device 102. In 120, the user 106 then proceeds to operate the vehicle 104 in order to navigate towards the POI. At a certain point prior to arriving at the destination, the mobile device 102 is connected to the vehicle 104. This connection may be established either before or after starting the vehicle 104 and before or after beginning to travel in the vehicle 104 to the POI. The connection may allow the device 102 to provide the user 106 with navigational directions towards the POI either directly or through the vehicle 104 (see 110 of FIG. 1B).

In 122, the user 106 has arrived at a location near the POI and stops the vehicle 104. The user 106 may park the vehicle 104 at or near the POI and in 124 may disconnect the device 102 from the vehicle 104 in one of the ways mentioned herein. Upon disconnecting the device 102, in 126 the user 106 is given the option of storing data on the device 102 (see 112 of FIG. 1B and example interface 802 of FIG. 8). The user 106 may store at least two general categories of data on the device 102: (i) data useful for remembering where and when the vehicle 104 was parked, and (ii) data useful for navigation after returning to the vehicle 104. The first category of data may include a picture of the vehicle 104, the time of day the vehicle 104 was parked, a countdown timer for an amount of time remaining on a parking meter, and the like (see example interface 804 of FIG. 8). The second category of data may include the geographic (GPS) coordinates of the vehicle 104, historical vehicle on-board sensor data at the time the vehicle 104 was stopped (e.g., odometer reading), and the like.

Figure 8:
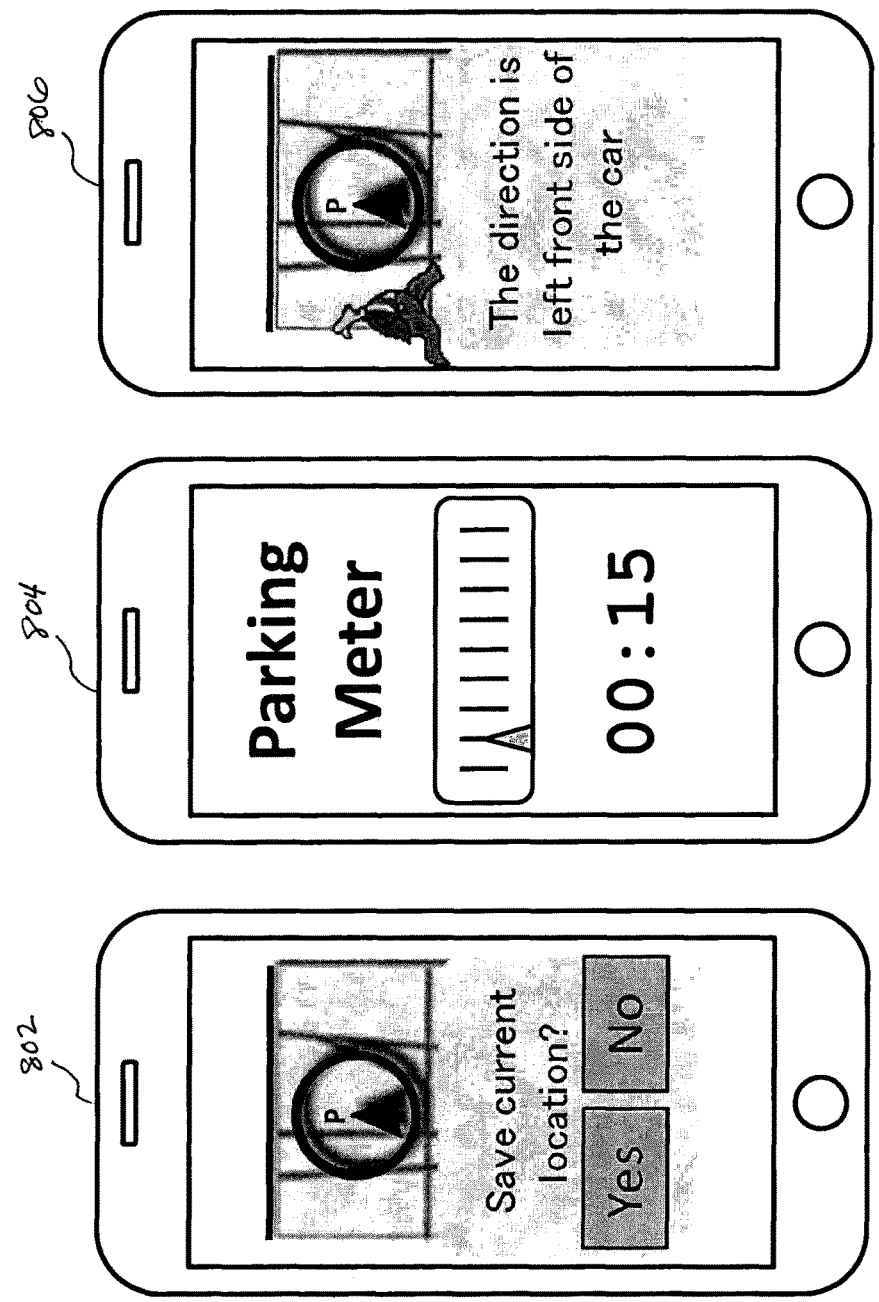
FIG. 8 depicts a set of example interfaces displayed to a user on a mobile device.

After storing the data, in 128, the device 102 may provide directions to the user 106 as to how to proceed from the vehicle 104 to the POI (see 114 of FIG. 1B and sample interface 806 of FIG. 8). The user 106 may proceed to the POI on foot or by alternative transportation means after exiting the vehicle 104. Similarly, the user 106 may employ the device 102 to return to the vehicle 104 from the POI. The first category of data may be recalled on the device 102 to aid the user 106 in locating the vehicle 104.

Once the user 106 has returned to the vehicle 104, the user 106 may in 130 start the vehicle 104 and in 132 once again connect the device 102 to the vehicle 104. The user 106 may wish to operate the vehicle 104 in order to navigate to the point of origin or to a new POI. This may be difficult or impossible if the GPS signal is weak or obstructed in some way. In such instances, the present disclosure provides that the user 106 may rely on the second category of data that was stored on the device 102 in 126. In 134, the second category of data may now be recalled to provide GPS coordinates of the vehicle 104 thereby allowing the user 106 to immediately receive navigational guidance to the new destination from either the device 102 or via the vehicle 104 (see 116 of FIG. 1B). In summary, the method allows the user 106 to store vehicle data when accurate GPS data is immediately available and later resume navigation when the GPS signal is weak or unavailable.

It is anticipated that situations may arise in which the user 106 has begun to operate the vehicle 104 prior to connecting the device 102. In such cases, the actual location of the vehicle 104 may or may not be substantially different then the location stored on the device 102 in 126. Therefore, additional data stored on the device 102 in 126 may be recalled and compared with current vehicle data to determine the accuracy of the stored location data. If, for example, a stored historical odometer value (that was created at the time device 102 was disconnected) is different from the current odometer value, the user 106 may be warned that the location data retrieved from device 102 may not be accurate. The user 106 may then choose to either override the warning and use the stored location data as the actual location of the vehicle 104 or discard the stored location data and therefore wait for a GPS signal from the service provider 108.

Figure 2:
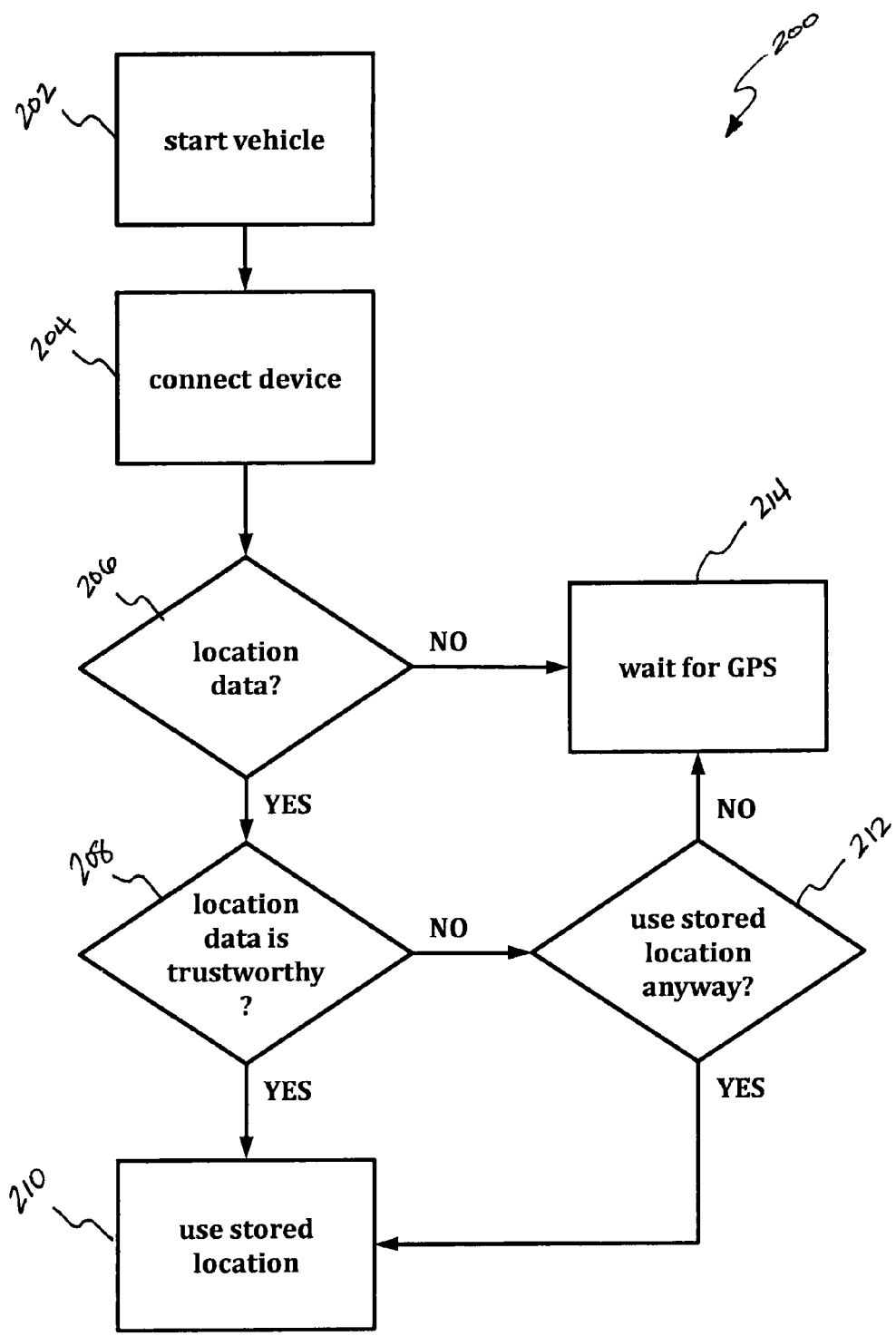
FIG. 2 is a flowchart of a method for evaluating and using stored location data.

FIG. 2 is a flowchart illustrating a method 200 for evaluating and using stored location data in accordance with the present disclosure. In one implementation, the location data may be stored on a mobile device (such as mobile device 102 of FIG. 1) that is configured to communicate with a vehicle (such as vehicle 104 of FIG. 1). The vehicle 104 is configured to retrieve that stored location information and then make a decision regarding whether the stored location information should be used, once retrieved.

In 202 the vehicle 104 is started. Once started, in 204 the vehicle 104 establishes a connection with a mobile device 102. In one implementation, the mobile device 102 may be the device 102 of the user 106 starting the vehicle 104. In other implementations, though, the mobile device 102 could be the mobile device of another occupant within the vehicle 104. The connection may be established wirelessly (in which case the connection may be established automatically and with no user interaction). Alternatively, the connection may be established by the user 106 physically connecting the mobile device 102 to a suitable port in the vehicle 104 to establish a wired connection. Upon connecting to the device 102, the vehicle 104 may communicate with the device 102 in order to access any available stored data.

In 206, the vehicle 104 attempts to retrieve a last known location of the vehicle 104 from device 102. The last known location data may be stored on mobile device 102 as a result of the execution of method illustrated in FIG. 1C, for example. If no location data is stored on the mobile device 102, in 214 the vehicle 104 attempts to acquire location data from a service provider 108 in order to identify a current location of the vehicle 104. The data from the service provider 108 may include GPS data such as the current location of the vehicle 104. In other implementations, for example, where the vehicle 104 does not have the capability to receive a GPS signal, the vehicle 104 may instead wait until the mobile device 102 has itself established a GPS connection and provided new location data to the vehicle 104. Alternatively, the vehicle 104 may attempt to acquire location data from service provider 108 before attempting to retrieve last known vehicle location data from the mobile device 102.

If relevant location data is identified, in 208 the vehicle 104 evaluates the retrieved data to determine whether the data is trustworthy or whether the data should be treated as suspect. This evaluation can be performed by analyzing a number of criteria to determine an accuracy of the last known vehicle location data retrieved from the mobile device 102. If, for example, the vehicle 104 has moved since the last known vehicle location data was stored on the mobile device 102, the location data may be suspect.

Accordingly, one example criterion that may be used to determine whether the retrieved last known vehicle location data is accurate is whether in-vehicle sensors indicate that the vehicle 104 has moved since the mobile device 102 recorded the vehicle's last known location. In implementations of the present system where the mobile device 102 stores, in addition to the last known vehicle location data, the vehicle's odometer reading at the time the last known location data was captured, the vehicle 104 can retrieve the odometer reading stored by the mobile device 102 and compare the reading to the vehicle's current odometer reading. If the two values match, this indicates that the vehicle 104 has not moved since the last known vehicle location data was stored by the mobile device 102 and that the location information should still be accurate. If, however, the two odometer values differ, this indicates that the vehicle 104 has been driven since the last known vehicle location data was stored on the mobile device 102. In this case, the last known vehicle location data may be treated as suspect.

In some implementations, a margin or threshold may be defined to allow for some variability between the stored odometer reading and the current reading. If the two values differ by less than the margin, then the two values may be considered to be the same. For example, if the two values only differ by 0.1 miles, the two values may be considered to be the same. In various implementations, the margin may be defined to be any appropriate distance. This margin may allow for the vehicle 104 to be driven a very short distance (e.g., backed out of a parking space), while the vehicle 104 is in the process of retrieving the last known vehicle location data from the mobile device 102. In that case, it may be desired that the stored last known vehicle location data be used, even though the odometer values may differ by some small amount.

In other implementations, the odometer data may be stored by the vehicle 104 rather than the mobile device 102. In some cases, other sensor systems may be used to determine whether the last known vehicle location data retrieved from the mobile device 102 is trustworthy. For example, the vehicle 104 can monitor the vehicle's speedometer since the last known vehicle location data was captured (in this case, the mobile device 102 may be considered to store, in addition to the last known vehicle location data, the time at which the location data was captured so that the time can be retrieved by the vehicle 104). If the speedometer deviates from 0 mph since the location data was captured, this may indicate that the vehicle 104 has moved and that the last known location data is not trustworthy. Similarly, the vehicle 104 may monitor one or more accelerometers installed within the vehicle 104 to detect potential movement of the vehicle 104 away from the last known vehicle location. Again, in some cases a margin or threshold can be defined. If, for example, the vehicle's speedometer has only deviated from 0 mph for a short time period (e.g., less than 30 seconds), then the vehicle 104 may be considered to have not moved since the last known vehicle location data was stored.

If, in 208 the vehicle 104 determines that the last known vehicle location data retrieved from the mobile device 102 is trustworthy, in 210 the vehicle 104 uses the location data retrieved from the mobile device 102 as the current location of the vehicle 104. In that case, the vehicle 104 can then display a suitable navigation interface using one or more of the vehicle's display screens depicting the vehicle 104 in its current location (i.e., the last known vehicle location).

If, in 208 the vehicle 104 determines that the last known vehicle location data retrieved from the mobile device 102 is not trustworthy, the vehicle 104 (or, in some implementations, the device 102) prompts the user 106 for an input in 212. The prompt may include notifying the user 106 that the retrieved last known vehicle location data is suspect and asking the user 106 whether the location data should be used anyway. If the user 106 indicates in 212 that the location data should be used anyway, the method moves to 210 and the vehicle 104 uses the last known vehicle location data. If, however, in 212 the user 106 indicates that the last known vehicle location data should not be used, the method moves to 214.

In one example of the method 200, data associated with a location in which the vehicle 104 was previously parked may be stored on the device 102. Upon starting the vehicle 104 and connecting the device 102 to the vehicle 104, the location data may be retrieved from the device 102 and used as the current location of the vehicle 104 for navigation purposes. This data is useful if a GPS signal cannot be immediately obtained from a service provider 108. However, in the case where the vehicle 104 has moved from the location in which the vehicle 104 was previously parked (e.g., as determined by a change in the odometer reading), an evaluation can be made to prompt the user 106 that the location data may not be valid and a choice can be made by the user 106 to wait for a GPS signal or to use the location data anyway. Furthermore, if the location data is not available on the device 102 or the location data cannot be identified by the vehicle 104, a determination may be made to wait for the GPS signal from the service provider 108.

Figure 3:
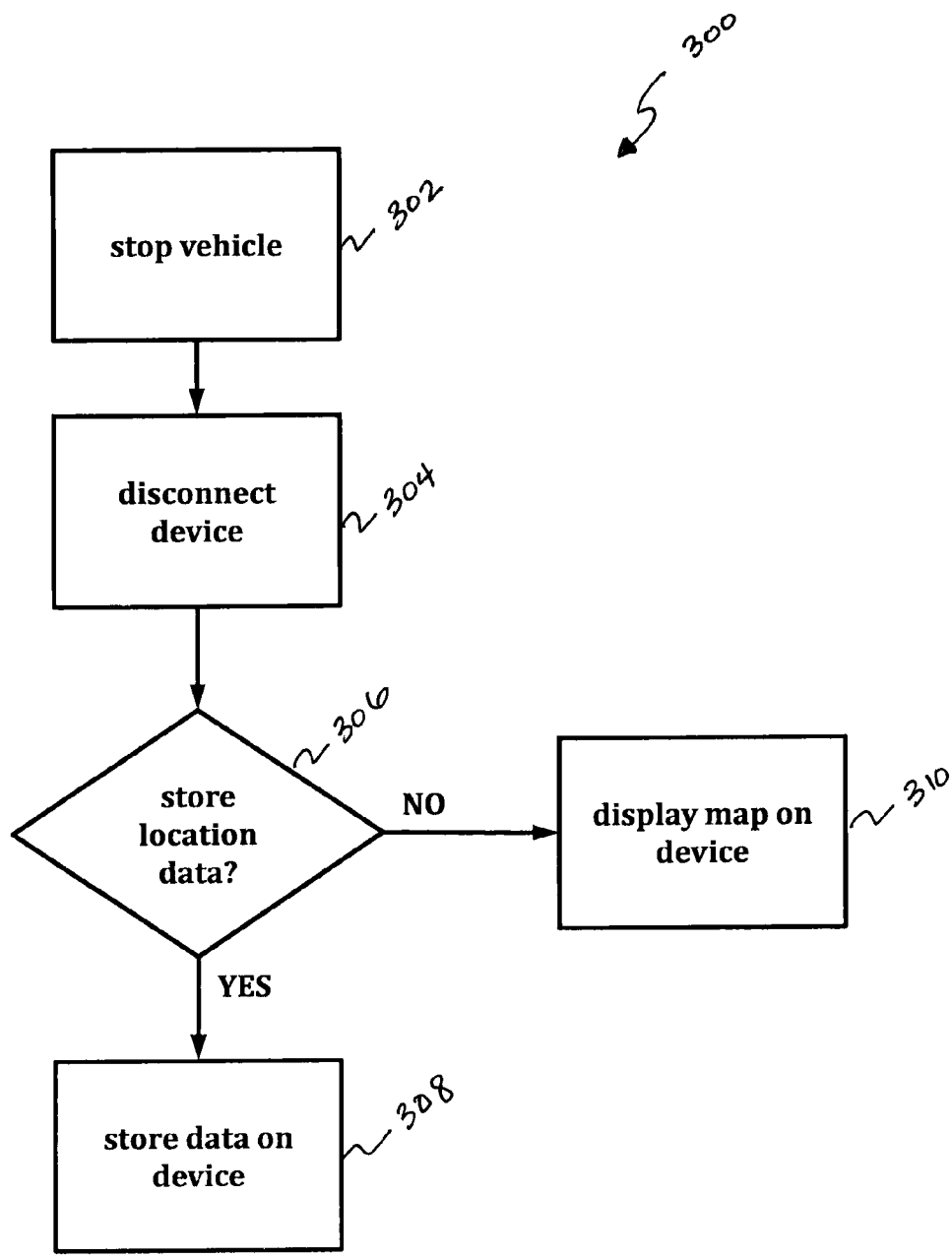
FIG. 3 is a flowchart of a method for storing location data after a vehicle is stopped in a first scenario.

FIG. 3 is a flowchart illustrating a method 300 for storing location data after a vehicle is stopped in a first scenario. The method may be used, for example, to store last known vehicle location data on a mobile device when a vehicle is parked at a particular location. The last known vehicle location data can then be retrieved by the vehicle at a later time and used to indicate the vehicle's location should other sources of location data (e.g., a GPS signal) be unavailable. Generally, the method of FIG. 3 is executed in an environment where the vehicle is connected to a mobile device (either by a wired or wireless connection). The mobile device is capable of determining its current location (e.g., using a GPS system) and is also capable of determining (or being informed of) when the mobile device has either been disconnected from the vehicle or the vehicle has been turned off or parked.

In 302 of method 300 the vehicle 104 is stopped, such as when the vehicle 104 is parked in a parking lot. In 304, after stopping the vehicle 104, the mobile device 102 is disconnected from the vehicle 104. The disconnection may occur because the vehicle 104 has been turned off (in which case the mobile device 102 loses its connection to the vehicle 104). Alternatively, the mobile device 102 may have been physically disconnected from the vehicle 104 (e.g., by the mobile device 102 being physically disconnected from a wired connection to the vehicle 104 or being moved out of range of a wireless connection to the vehicle 104).

After detecting that the vehicle 104 is disconnected from the mobile device 102 (or, in some cases, determining that the vehicle 104 is parked or has been placed in park), in 306 the device 102 prompts the user 106 for an input to determine whether the current location of the mobile device 102 should be stored for later retrieval by the vehicle 104 as the last known location of the vehicle 104. If the user 106 provides an input in the affirmative, in 308 the device's current location data is stored for later retrieval by the vehicle 104. 308 may include the mobile device 102 storing the GPS coordinate of the current location of the vehicle 104 or device 102. In some implementations, the mobile device 102 may store additional data that can be used by the vehicle 104 to determine whether the stored location data is trustworthy (i.e., that the data has not become stale), as described with respect to FIG. 2. The additional data may include, for example, a current odometer value of the vehicle 104, or the current time at which the last known vehicle location data was stored. It will be readily appreciated that all or some of the data stored by the mobile device 102 in accordance with 308 may also be stored in part or in whole by the vehicle 104 for later retrieval. In some implementations, to ensure that the additional data is available to device 102 after being disconnected from the vehicle, device 102, while connected to the vehicle 104, periodically polls the vehicle for the additional data (for example, every 10 seconds). Upon being disconnected, the device 102 can then use the most current additional data captured from the vehicle as part of the periodic polling process.

If, however, in 306 the user 106 indicates that the current location data of the mobile device 102 is not to be stored for later retrieval, in 310 the data, such as location data, is not stored on the device 102 and may instead displayed for review by the user 106. In some implementations, the device 102 may provide additional means for storing information such as an image of the vehicle location, the time of day at which the car was stopped or parked, and parking meter information such as the amount of time remaining on a paid or unpaid parking meter.

Figure 4:
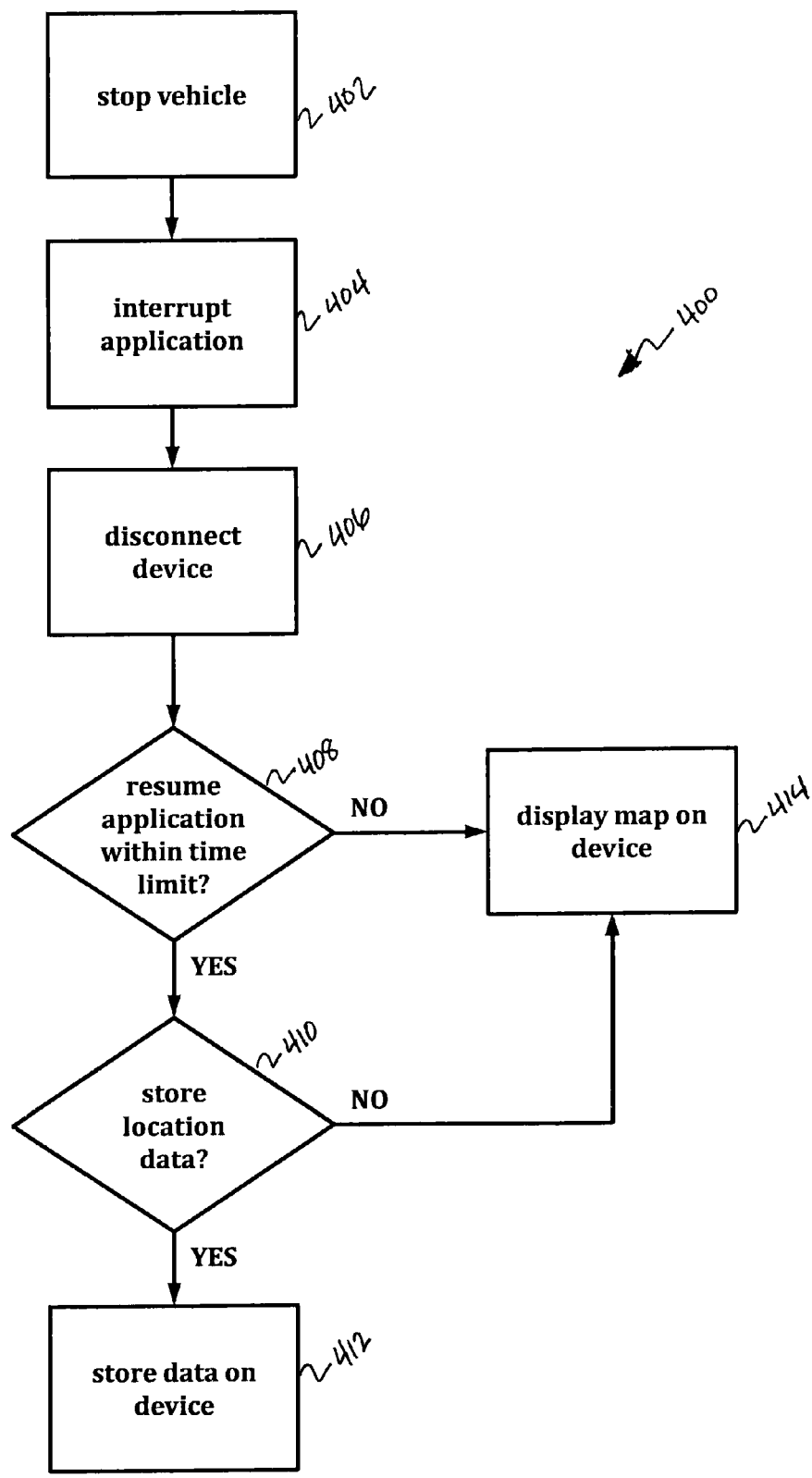
FIG. 4 is a flowchart of a method for storing location data after a vehicle is stopped in a second scenario.

FIG. 4 is a flowchart depicting an alternative method for storing location data after a vehicle is stopped. The method may be implemented, for example, by a mobile device that is in communication with a vehicle. In the present example, the mobile device 102, while connected to the vehicle 104, may be running an application, such as a navigation app to assist a driver in navigating the vehicle 104.

Referring to FIG. 4, in 402 the vehicle 104 is stopped or parked. At this time, the vehicle 104 is connected to device 102. In 404, an application running on the device 102 may be interrupted (e.g., by pausing, or quitting). The application may be used to facilitate the communication of information between the device 102 and the vehicle 104. In certain embodiments of the present disclosure, the application must be active in order for data such as location data to be stored on the device 102. In 406, the device 102 is disconnected from the vehicle 104.

Upon disconnecting the device 102, in 408 it is determined whether the application is resumed on the device 102. In one embodiment of the present disclosure, a predetermined time frame may be set during which the application may be resumed, wherein resuming the application within the predetermined time-frame results in the affirmative outcome of 408. Alternatively, if the application is not resumed within the predetermined time frame, 408 may result in the negative outcome.

If 408 of the method 400 culminates in the affirmative, in 410 the device 102 prompts the user 106 for an input as to whether current location data (e.g., the current location data for the device 102) is to be stored by the mobile device 102. If the user 106 provides an input in the affirmative, in 412 the mobile device 102 stores certain data. This data may include vehicle 104 data such as the GPS coordinate of the current location of the vehicle 104 or device 102. Further example of data that may be stored in the sixth 412 of the method 400 may include the current odometer value, or the current time.

If 408 culminates in the negative, in 414 the data, such as location data is not stored on the device 102. Under certain other conditions, the outcome of 410 may be that the user 106 provides an input in the negative. In the negative case, in 414 the data, such as location data, is not stored on the device 102.

A further aspect of either 412 or 414 of the method 400 may be that the device 102 communicates additional information to the user 106. For example, the device 102 may provide a means for storing information such as an image of the vehicle location, the time of day at which the car was stopped or parked, and parking meter information such as the amount of time remaining on a paid or unpaid parking meter.

As with the method 300, one example use of method 400 for storing location data after a vehicle is stopped may provide that a device 102 may be used to store location data which can be used in the method 200 (e.g., in 206). Furthermore, in certain embodiments of the method 400, an application is present to facilitate communication between the device 102 and the vehicle 104. If the application is interrupted before the device 102 is disconnected from the vehicle 104, whether or not location data is stored may be dependent on the application being resumed.

Figure 5:
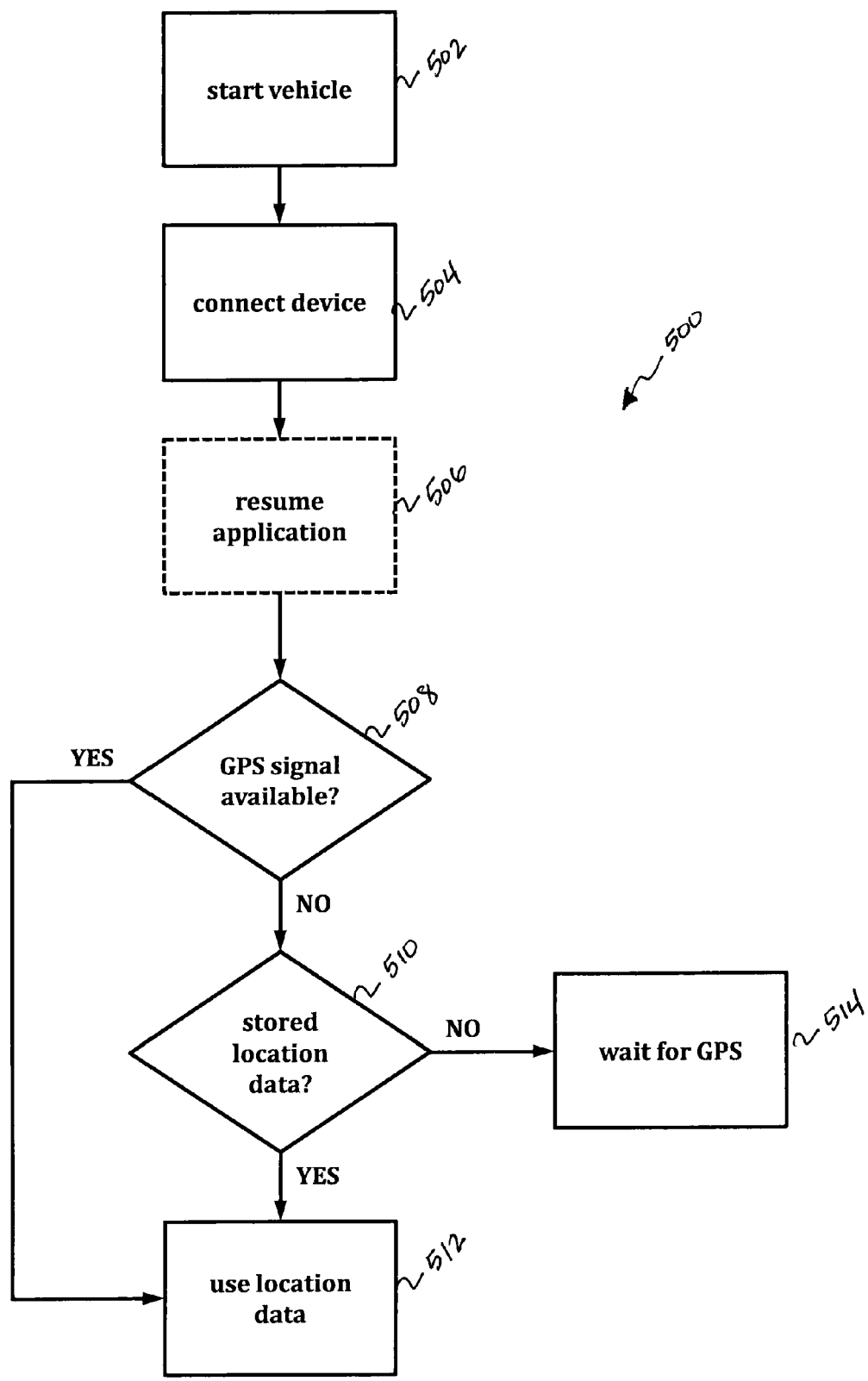
FIG. 5 is a flowchart of a method for evaluating and using stored location data after a vehicle is started in a first scenario.

FIG. 5 is a flowchart illustration a method 500 for evaluating and using stored location data retrieved from a connected mobile device after a vehicle is started. In 502 a vehicle, such as vehicle 104, is started. After the vehicle 104 is started, in 504 the vehicle 104 establishes a connection with a mobile device (e.g., mobile device 102). As described above, this connection may be made wireless (in which case the connection may be established without user interaction) or wired, in which a user 106 may be required to connect the mobile device 102 to a suitable port of the vehicle 104. After the vehicle 104 is connected to the mobile device 102, the vehicle 104 may communicate with the device 102 in order to access any available stored data. The stored data may include information such as a last known location of the vehicle 104 and data relating to instrumentation associated with the vehicle 104 such as the odometer, speedometer, fuel injection system, and vehicle stability control system.

In optional 506 an application running on the device 102, such as a navigation application, may be activated (e.g., by starting or resuming that application). The application may be used to facilitate the communication of information between the device 102 and the vehicle 104. In certain embodiments of the present disclosure, the application must be active in order for data such as location data to be stored on the device 102. In other embodiments, though, the application is not required and the mobile device 102 will be configured to communicate with the vehicle 104 even if the application is not running.

In 508, the vehicle 104 makes a determination as to whether a GPS signal is available. The GPS signal may be obtained from a service provider 108 and may be accessible via the device 102. Depending on whether a GPS signal is available, a predetermined action may be taken. In the negative case in which a GPS signal cannot be obtained such that the location of the vehicle 104 cannot be accurately determined, in 512 the vehicle 104 attempts to retrieve last known vehicle location data from the device 102. If the data is identified by the vehicle 104, in 512 the vehicle 104 uses the last known vehicle location data stored on the device 102 as the vehicle's location. In that case, the vehicle 104 can then display a suitable navigation interface using one or more of the vehicle's display screens depicting the vehicle in its current location (i.e., the last known vehicle location).

Under certain conditions, the outcome of 508 may be that a GPS signal is obtained. In the affirmative case in which a GPS signal is obtained such that the location of the vehicle 104 can be accurately determined, the method may jump to 512, thereby foregoing the retrieval of last known vehicle location data that would otherwise have been performed in 510.

Under certain conditions, the outcome of 510 may be that relevant data, such as location data, is not stored on the device 102. In the negative case, in 514 an attempt is made to acquire location data from a service provider 108. The data from the service provider 108 may include GPS data such as the current location of the vehicle 104.

Data associated with a location in which the vehicle 104 was previously parked may be stored on the device 102. After starting the vehicle 104 and connecting the device 102 to the vehicle 104, an application on the device 102 may be resumed. Upon resuming the application on the device 102, the availability of a GPS signal may be determined. If the GPS signal is available, the location of the vehicle 104 can be determined without retrieving location data from the device 102. However, if a GPS signal is not obtained, the location data may be retrieved from the device 102 and used as the current location of the vehicle 104 for navigation purposes.

Analogous to method 200 of FIG. 2, method 500 may include evaluating last known vehicle location data stored on a connected mobile device. For example, a determination may be made as to whether the last known vehicle location data stored on the device 102 and/or the vehicle 104 meet certain criteria in order to determine if the location data is valid. For example, in the case where the vehicle 104 has moved from the location in which the vehicle 104 was previously parked (or onboard sensor data, such as an odometer sensor, steering wheel sensor, speed sensor, and the like indicate that it is likely that the vehicle 104 has moved since the location data was captured), an evaluation can be made to prompt the user 106 that the location data may not be valid and a choice can be made by the user 106 to wait for a GPS signal or to use the location data anyway. Finally, if the location data is not available on the device 102 or the location data cannot be identified by the vehicle 104, a determination may be made to wait for the GPS signal from the service provider 108.

Figure 6:
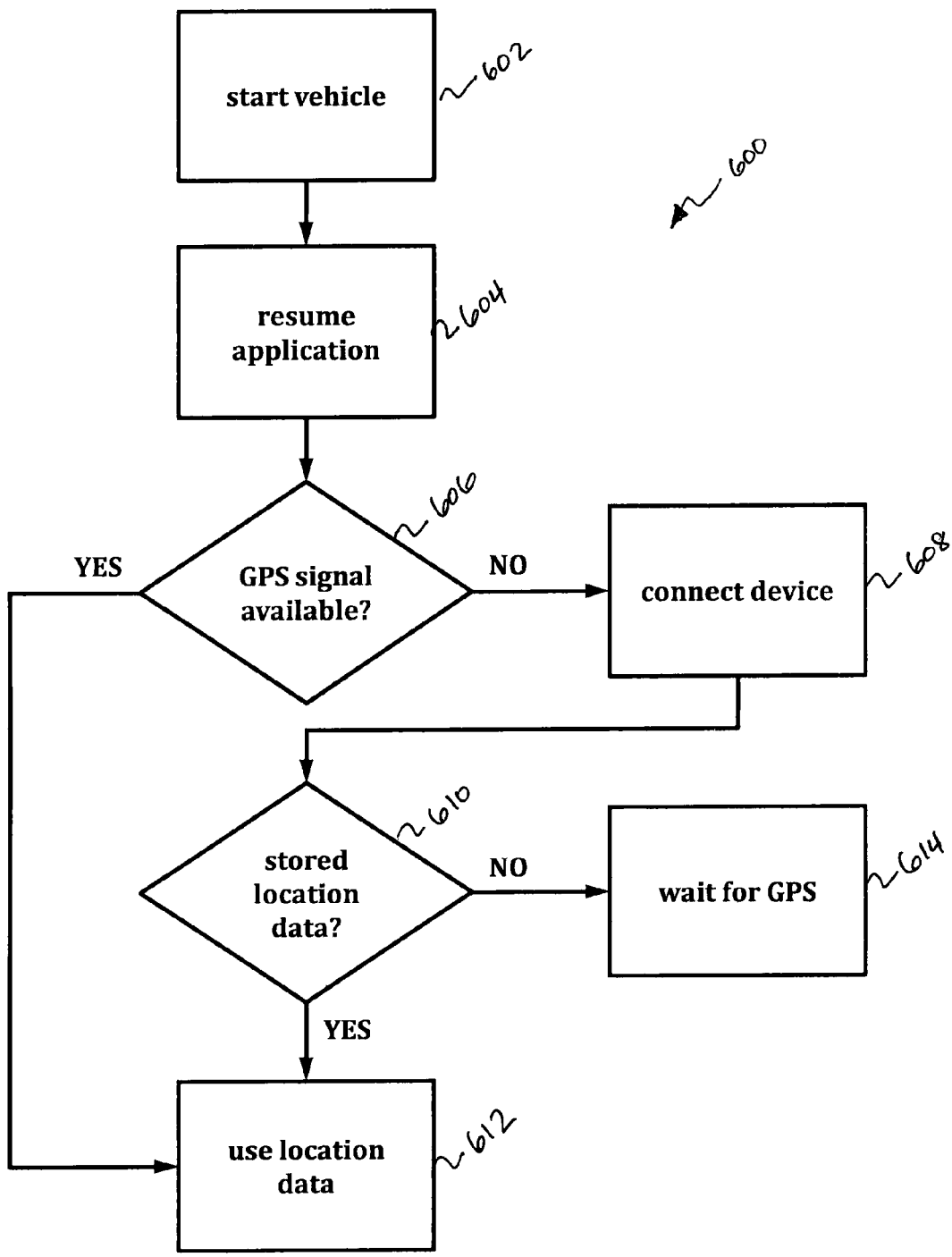
FIG. 6 is a flowchart of a method for evaluating and using stored location data after a vehicle is started in a second scenario.

FIG. 6 is a flowchart illustrating a method 600 for evaluating and using stored location data retrieved from a mobile device after a vehicle is started in a second scenario. Referring to FIG. 6, in 602 the vehicle (e.g., vehicle 104) is started. In 604, a navigation application is executed on the device 102. In the scenario exemplified by the method 600, the device 102 may not yet be connected to the vehicle 104 when the method is executed. The application may be used to facilitate the communication of information between the device 102 and the vehicle 104. In certain embodiments of the present disclosure, the application must be active in order for data such as location data to be stored on the device 102 and communicated between device 102 and the vehicle 104.

In 606, the vehicle 104 makes a determination as to whether a GPS signal is available. The GPS signal may be obtained from a service provider 108 and may be accessible via the device 102 or may be directly received by the vehicle 104. Depending on whether a GPS signal is available, a predetermined action may be taken. If a GPS signal cannot be obtained such that the location of the vehicle 104 cannot be accurately determined, in 608 the device 102 is connected to the vehicle 104. The device 102 may be connected to the vehicle 104 by a wireless connection. In that case, in 608, once it is determined that a GPS signal is not available, the vehicle 104 may search in its vicinity for a suitable device 102 to which the vehicle 104 may connect. In some cases, a user 106 may be required to initiate the wireless connection procedure. Alternatively, 608 may involve a user 106 physically connecting the mobile device 102 to a suitable port on the vehicle 104. Upon connecting the device 102, the vehicle 104 may communicate with the device 102 in order to access any available stored data. The stored data may include information such as a last known location of the vehicle 104 and stored data relating to instrumentation associated with the vehicle 104 such as the odometer, speedometer, fuel injection system, and vehicle stability control system.

After connecting the device 102 to the vehicle 104, in 610 the vehicle 104 evaluates whether last known vehicle location data has been retrieved from device 102. If so, in 612 the vehicle 104 can then use that retrieved last known vehicle location data to display a suitable navigation interface using one or more of the vehicle's display screens depicting the vehicle in its current location (i.e., the last known vehicle location).

If no vehicle location data is retrieved from the mobile device 102, in 614 the vehicle 104 attempts to acquire data from a service provider 108. The data from the service provider 108 may include GPS data such as the current location of the vehicle 104.

Referring back to 606, if a GPS signal is obtained such that the location of the vehicle 104 can be accurately determined, the method moves to 612 and the vehicle 104 can use the retrieved GPS location as the vehicle's current location. As such, 608 and 611 may be bypassed. In the case in which 608 and 610 are bypassed, the device 102 may still be connected to the vehicle 104 as in 608. In this instance, upon connecting the device 102, data may or may not be acquired from the device 102 to determine the current location of the vehicle 104.

Data associated with a location in which the vehicle 104 was previously parked may be stored on the device 102. The vehicle 104 may be started without connecting the device 102. After starting the vehicle 104, the availability of a GPS signal may be determined. If the GPS signal is available, the location of the vehicle 104 can be determined without retrieving location data from the device 102. However, if a GPS signal is not obtained, the device 102 may be connected to the vehicle 104 in order to retrieve the location data from the device 102. The location data may be used as the current location of the vehicle 104 for navigation purposes.

Analogous to the method 200 of FIG. 2, the method 600 may include evaluating stored location data. For example, a determination may be made as to whether the data stored on the device 102 and/or the vehicle 104 meet certain criteria in order to determine if the location data is valid. For example, in the case where the vehicle 104 has moved from the location in which the vehicle 104 was previously parked, an evaluation can be made to prompt the user 106 that the location data may not be valid and a choice can be made by the user 106 to wait for a GPS signal or to use the location data anyway. Finally, if the location data is not available on the device 102 or the location data cannot be identified by the vehicle 104, a determination may be made to wait for the GPS signal from the service provider 108.

Figure 7:
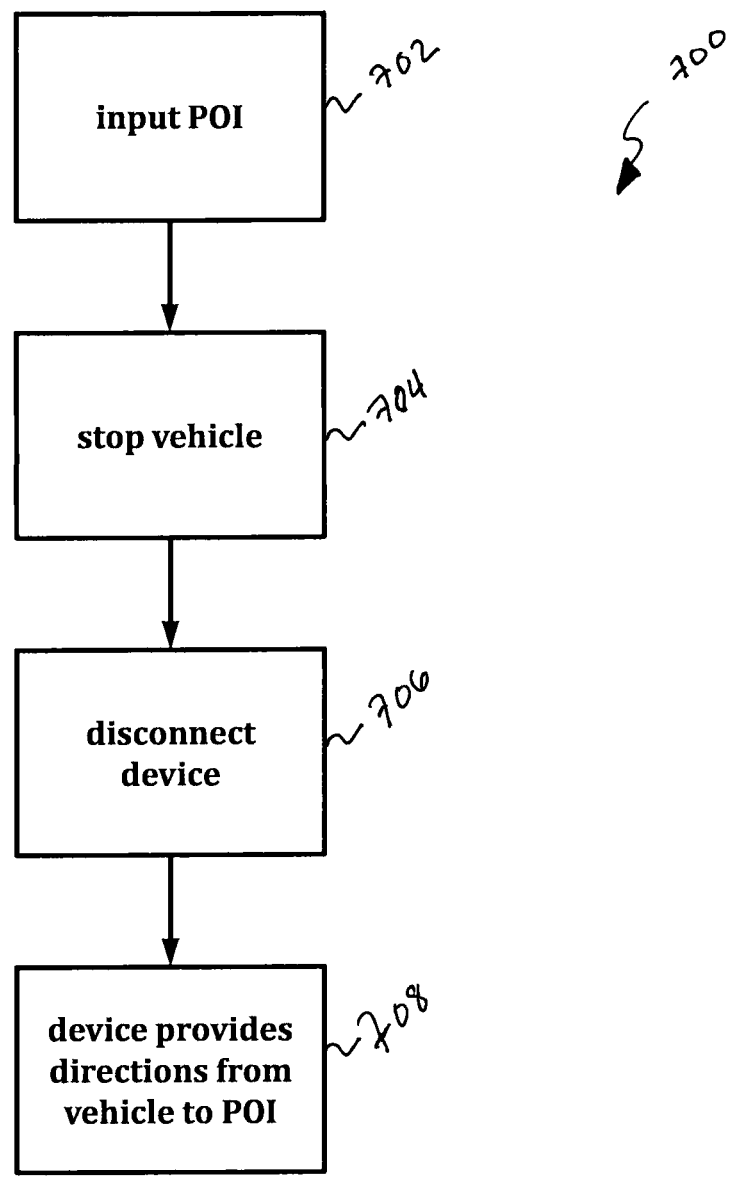
FIG. 7 is a flowchart of a method for providing directions to a point of interest after a vehicle is stopped.

FIG. 7 is a flowchart illustrating a method 700 for providing directions to a point of interest after a vehicle (e.g., the vehicle 104) is stopped. In 702, a POI is supplied to a vehicle 104 or a device 102 through a suitable user interface. For example, when the POI is provided to the vehicle 104, the POI may be provided through a user interface for a navigation application of the vehicle 104 depicted upon one or more display screen within the vehicle 104. Similarly, when the POI is supplied to the device 102, the POI may be entered through an appropriate user interface provided by a navigation application running on the mobile device 102. Once the POI is inputted into a suitable navigation application (provided by either the vehicle 104 or the device 102), the navigation application can provide navigation assistance to enable a driver to drive the vehicle 104 towards the POI. The device 102 is connected to the vehicle 104 and when a POI is entered into the vehicle's navigation system, the POI is transmitted to the mobile device 102 for later use, as detailed below.

In 704, the vehicle 104 is stopped (e.g., after the vehicle 104 is parked and the engine is switched off). In 706, the device 102 is disconnected from the vehicle 104. The disconnection may involve the device 102 being physically separated from a port in the vehicle 104. Alternatively, the disconnection may occur when the vehicle 104 is powered off and the device 102 is no longer able to communicate with the vehicle 104. Alternatively, the disconnection may occur when the device 102 is moved away from the vehicle 104 by a sufficient distance that the device 102 can no longer communicate with the vehicle 104. Upon disconnecting the device 102, in 708 the device 102, using a suitable navigation application, provides directions from the current location to the POI. In one implementation, the directions may include an indication of a direction to the inputted POI. The indication of a direction may rely upon the orientation of the vehicle 104, thereby allowing the user 106 to determine in which direction of the POI is located in reference to, for instance, the orientation of the vehicle 104 (e.g., the direction in which the vehicle is pointing). In one example, if the POI lies to the west of the vehicle 104 and the vehicle is parked facing north, the device 102 may indicate that the direction of the POI is to the left of the vehicle 104. In other implementations, a map may be depicted with walking directions to the POI.

One aspect of a schematic diagram of a typical method 700 for providing directions to a POI after a vehicle 104 is stopped is that a user 106 may use a device 102 in communication with a vehicle 104 to navigate to a POI. The vehicle 104 may then be parked near the POI and the device 102 disconnected from the vehicle 104. If the location of the parked vehicle 104 does not coincide with exact location of the POI, the device 102 may provide directions as to the location of the POI. For example, the device 102 may communicate that the POI is directly in front of the vehicle 104 or the device 102 may communicate that the user 106 should walk to the right of the vehicle 104 to reach the POI.

Another aspect of a typical method 700 for providing directions to a point of interest after a vehicle 104 is stopped is that the method 700 by be integrated with any of the methods illustrated in FIGS. 1-6. For example, a typical method 300 for storing location data after a vehicle 104 is stopped in a first scenario may be combined with the method 700. In this instance, if a POI was provided to the device 102, the device may provide directions to the POI after 308 or 310 of the method 300.

Finally, FIG. 8 is a set of example interfaces displayed to a user 106 on a mobile device 102. 802 is an example of an interface displayed on the device 102 after the user 106 has parked the vehicle 104 and disconnected the device 102. The interface allows the user 106 to choose whether or not to store the current location of the stopped vehicle 104. 804 is an example of an interface displayed on the device 102 before or after the 802 interface is displayed. The interface allows the user 106 to store data such as the time remaining in the case of a metered space, the time of day the vehicle 104 was parked, a photograph of the vehicle 104 in the location, and the like. 806 is an example of an interface displayed to the user 106 after stopping the vehicle 104 (see, for example, 114 of FIG. 1B and 128 of FIG. 1C). The interface may display basic instructions to allow the user 106 to navigate to the POI from the vehicle 104.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. In addition, various modifications and changes may be made within the scope of the attached claims.

This present disclosure describes preferred embodiments with reference to the Figures. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the description, numerous specific details are recited to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included are generally set forth as logical flow-chart diagrams. As such, the depicted order and labeled aspects are indicative of one embodiment of the presented method. Other aspects and methods may be conceived that are equivalent in function, logic, or effect to one or more aspects, or portions thereof, of the illustrated method. Additionally, the format and symbols employed are provided to explain the logical aspects of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated aspects of the depicted method. Additionally, the order in which a particular method occurs may or may not strictly adhere to the order of the corresponding aspects shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
   detecting a connection between a device and a vehicle;
   after detecting the connection, identifying a first set of data stored on the device, the first set of data including a last known location of the vehicle;
   comparing a current value of a vehicle sensor to a historical value of the vehicle sensor, wherein the historical value was captured from the vehicle sensor at about a time the first set of data was stored on the device; and
   when the current value of the vehicle sensor is the same as the historical value of the vehicle sensor, using the first set of data to define a current location of the vehicle.

2. The method of claim 1, wherein the vehicle sensor is an odometer.

3. The method of claim 1, wherein the vehicle sensor is a speedometer.

4. The method of claim 1, wherein the historical value of the vehicle sensor is stored on the device.

5. The method of claim 1, including acquiring a signal from a global positioning system service provider when the first set of data cannot be identified on the device.

6. The method of claim 1, wherein the device includes a mobile phone.

7. The method of claim 1, wherein the device connects to the vehicle using a Bluetooth connection.

8. The method of claim 1, including, when the current value of the vehicle sensor is not the same as the historical value of the vehicle sensor, not using the first set of data to define a current location of the vehicle.

9. The method of claim 1, including, when the current value of the vehicle sensor is not the same as the historical value of the vehicle sensor, prompting a user to indicate whether the first set of data should be used to define a current location of the vehicle.

10. A system, comprising:
    a processor, the processor being configured to:
       detect a connection between a device and a vehicle;
       after detecting the connection, identify a first set of data stored on the device, the first set of data including a last known location of the vehicle;
       compare a current value of a vehicle sensor to a historical value of the vehicle sensor, wherein the historical value was captured from the vehicle sensor at about a time the first set of data was stored on the device; and
       when the current value of the vehicle sensor is the same as the historical value of the vehicle sensor, use the first set of data to define a current location of the vehicle.

11. The system of claim 10, wherein the vehicle sensor is an odometer.

12. The system of claim 10, wherein the vehicle sensor is a speedometer.

13. The system of claim 10, wherein the historical value of the vehicle sensor is stored on the device.

14. The system of claim 10, wherein the system includes a mobile phone or a vehicle.

15. The system of claim 10, wherein the processor is configured to, when the current value of the vehicle sensor is not the same as the historical value of the vehicle sensor, prompt a user to indicate whether the first set of data should be used to define a current location of the vehicle.

* * * * *